(12) United States Patent
Hesse

(10) Patent No.: US 9,726,757 B2
(45) Date of Patent: Aug. 8, 2017

(54) RADAR DEVICE AND PROCESS THEREFOR

(71) Applicant: Hella KGaA, Lippstadt (DE)

(72) Inventor: Thomas Hesse, Paderborn (DE)

(73) Assignee: Hella KGaA, Lippstadt (DE)

( * ) Notice: Subject to any disclaimer, the term of this patent is extended or adjusted under 35 U.S.C. 154(b) by 362 days.

(21) Appl. No.: 14/561,828

(22) Filed: Dec. 5, 2014

(65) Prior Publication Data

US 2015/0160336 A1    Jun. 11, 2015

(30) Foreign Application Priority Data

Dec. 11, 2013    (DE) .......................... 10 2013 113 806

(51) Int. Cl.
| | |
|---|---|
| *G01S 13/02* | (2006.01) |
| *G01S 7/03* | (2006.01) |
| *G01S 7/40* | (2006.01) |
| *G01S 13/93* | (2006.01) |
| *G01S 13/42* | (2006.01) |

(52) U.S. Cl.
CPC ................. *G01S 13/02* (2013.01); *G01S 7/03* (2013.01); *G01S 7/4008* (2013.01); *G01S 7/4017* (2013.01); *G01S 13/42* (2013.01); *G01S 13/931* (2013.01); *G01S 2007/4013* (2013.01)

(58) Field of Classification Search
CPC ........ G01S 13/02; G01S 13/42; G01S 13/931; G01S 2007/4013; G01S 7/03; G01S 7/4008; G01S 7/4017
USPC ......................................................... 342/82
See application file for complete search history.

(56) References Cited

U.S. PATENT DOCUMENTS

2007/0182619 A1 *    8/2007    Honda ................... H01Q 25/02
                                                                342/80

FOREIGN PATENT DOCUMENTS

| DE | 102009027368 A1 | 1/2011 |
|---|---|---|
| DE | 102011055693 A1 | 5/2013 |
| DE | 102012201990 A1 | 8/2013 |

* cited by examiner

*Primary Examiner* — Timothy A Brainard
(74) *Attorney, Agent, or Firm* — Husch Blackwell LLP

(57) ABSTRACT

A radar device for the transmission of a signal in a frequency band. The radar device includes a control means and an oscillator. The input of the oscillator is connected to the control means by means of a converter. The oscillator is controllable by means of the control means for the generation of the signal. The signal is generated by means of the oscillator and can be picked up on an output of the oscillator. The radar device also includes at least one transmission aerial for the transmission of the signal being present at the output of the oscillator. The transmission aerial is connected to the output of the oscillator. At least one receiver channel is provided for the reception of a received signal and for the processing of the received signal and for the transmission of the processed received signal to the control means. The receiver channel has at least one receiving aerial and a mixer for the mixing of the received signal with the signal which is present at the output of the oscillator. The mixer is connected to the output of the oscillator, and the output of the oscillator is connected to an input of a switchable amplifier and the amplifier provides a signal at the output and transmits it to the at least one mixer. A wattmeter is provided, which monitors the signal at the output of the amplifier and transmits it to the control means.

9 Claims, 6 Drawing Sheets

RADAR DEVICE AND PROCESS THEREFOR

CROSS REFERENCE

This application claims priority to German Application No. 10 2013 113806.3, filed Dec. 11, 2013, which is hereby incorporated by reference.

FIELD OF TECHNOLOGY

The invention relates to a radar device, particularly for a motor vehicle, and a respective process.

BACKGROUND

Radar devices are well known in the state of the art. They are more and more used in motor vehicles to allow the execution of driver assistance functions. Here, radar devices are used for the detection of the environment or of objects in standing and flowing traffic. As motor vehicle control intervention, such as engine intervention or brake intervention, can be executed on the basis of the data of the radar device, the reliable function of such radar devices are of high importance.

In a radar device, the routing of a local-oscillator signal (LO-signal) by a used oscillator, such as a 24 GHz-oscillator, is possible vial respective HF-lines for the mixers of the receiver channels.

This signal routing allows a coherent mixture of the received signal in an NF-frequency band and therefore also signal processing based on this for the detection of targets in the environment of the radar device. For this reason, the verification of the presence of a correct LO-signal at the mixer input is of great importance for the internal diagnosis of the radar device. A faulty generation of the LO-signal or malfunction-caused damping or interruption of the LO-line should therefore be reliably detected during sensor diagnosis to avoid undefined operation and to bring the device into a defined condition.

Current radar devices do not allow the checking of the LO-signal and the LO-lines. A defect in this area would be detected only with limited reliability due to the detection of the failure of one or more receiver channels.

SUMMARY OF THE INVENTION

It is the task of the invention to develop a radar device, which is improved with regard to the detection of defects relative to the state-of-the-art. Furthermore, the task is the development of a process for the operation of a radar device, which is improved relative to the state-of-the-art.

An embodiment of the invention relates to a radar device for the transmission of a signal in a frequency band, having a control means, having an having an oscillator, wherein an input of the oscillator is connected to the control means by means of a converter, the oscillator being controllable by means of the control means for the generation of the signal and the signal being generated by means of the oscillator can be picked up on an output of the oscillator, having at least one transmission aerial for the transmission of the signal being present at the output of the oscillator, wherein the transmission aerial is connected to the output of the oscillator, with at least one receiver channel for the reception of a received signal, for the processing of the received signal and for the transmission of the processed received signal to the control means, wherein the receiver channel has at least one receiving aerial and a mixer for the mixing of the received signal with the signal which is present at the output of the oscillator, wherein the mixer is connected via a LO-path to the output of the oscillator, wherein the output of the oscillator is connected to an input of a switchable LO-amplifier and the LO-amplifier provides a signal at the output and transmits it to the at least one mixer, and a wattmeter being provided, which monitors the signal at the output of the amplifier and transmits it to the control means. By this means, an improved detection of malfunctions of the radar device is achieved.

According to the invention, it is advantageous if the switchable LO-amplifier is can be controlled by control unit being in connection with the control means via an interface. By this means, the switchable amplifier can be activated in a targeted manner for malfunction identification.

It is also advantageous if a multiplexer is provided, which is connected with the control unit and the wattmeter on the input side and with an analog-digital converter of the control means on the output side.

Furthermore, it is advantageous if the oscillator, the amplifier, the control unit and the wattmeter are embodied as an integral unit.

According to the invention it is advantageous, if the integral unit also comprises at least one receiver channel with a respective mixer. Alternatively this could also be missing in the integral unit.

Furthermore, it is advantageous if a further integral unit is provided, which comprises at least one further receiver channel with a respective mixer.

It is particularly advantageous, if a receiver channels for the reception of a received signal, for the processing of the received signal and for the transmission of the processed received signal to the control means has a mixer, wherein the output of the mixer is connected with a mixer, and the output of the filter is connected with an analog-digital converter to the control means.

It is also advantageous if the output signal of the oscillator, being LO-signal-time-dependent, can be changed from a low level to a raised level resp. vice-versa by means of the switchable amplifier, and such a signal can be mixed with the aerial signals of the individual receiver channels into the baseband and filtered by means of the filters.

It is particularly advantageous, if the frequency of the LO-measuring signal lies within the passband of the filter, such as e.g. a band-pass filter, due to the selection of the frequency of the switching sequence of the switchable amplifier, so that shares of the LO-measuring signal are not dampened by the filters and are detectable in the sampled received signals

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
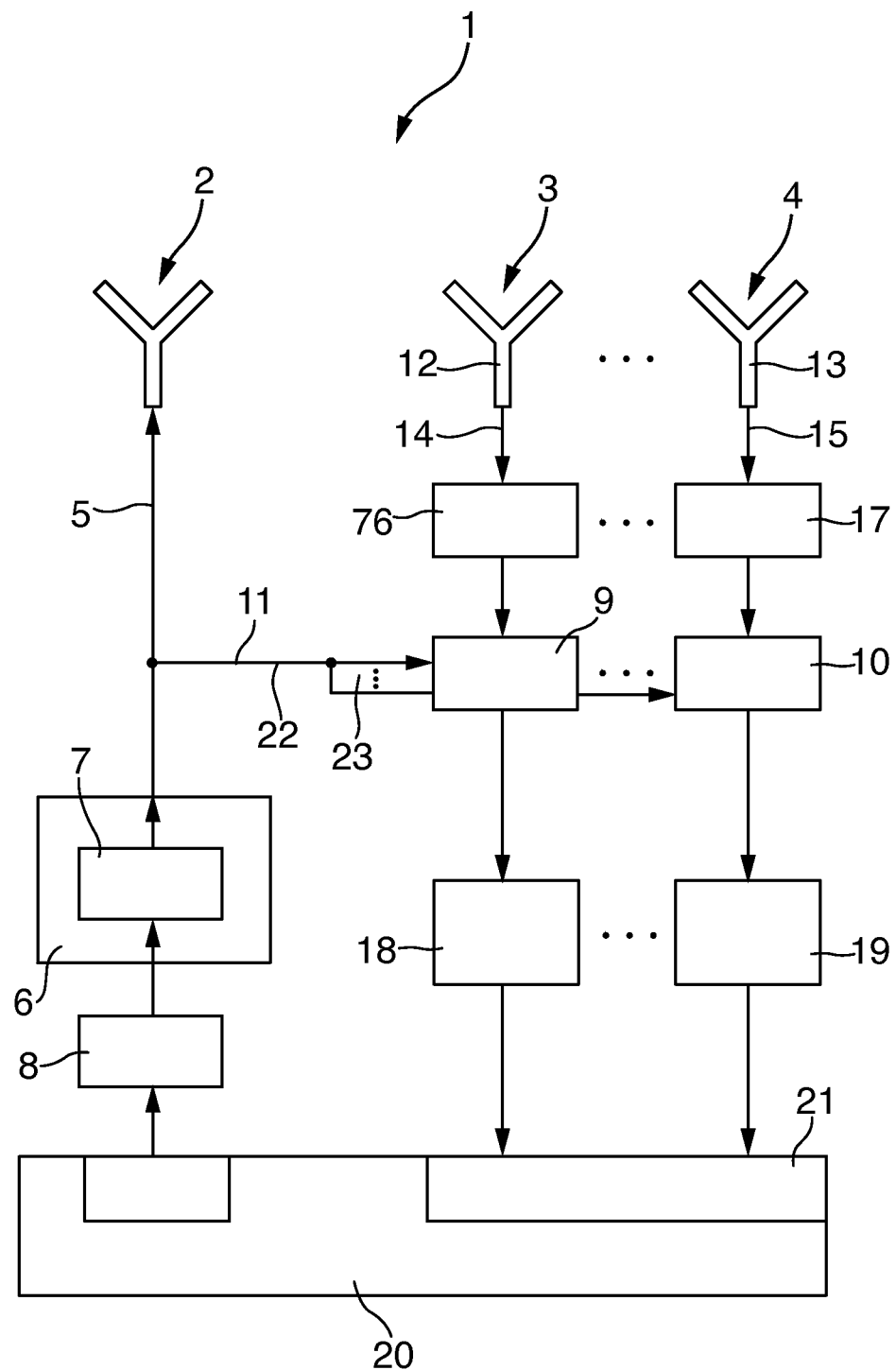
FIG. 1 is a schematic view of a radar device according to the state of the art.

FIG. 1 shows the design of a radar device 1, such as a radar sensor, according to the state-of-the-art with regard to the generation of the transmitted signal and the reception of the received signal.

To this end, the radar device has a transmission path 2 and receiver channels 3, 4. The generation of the transmitted signal 5, also called TX-signal, in the frequency range around 24 GHz is achieved by the activation of a voltage-controlled oscillator 7 (voltage-controlled oscillator or VCO) integrated in a monolithic microwave integrated circuit 6 (MMIC) via a digital-analog converter 8 (DAC) in the transmission path 2.

Equivalent to the analog voltage curve generated by the digital-analog converter 8, a 24 GHz signal with a respective frequency sequence occurs. This signal represents on one hand the transmission signal 5 (TX-signal) and on the other hand also the LO-signal 11 transmitted to the mixers 9, 10 of the receiver channels 3, 4. The mixing of the signals 14, 15 received by the receiver aerials 12, 13 in the baseband is executed by means of this LO-signal 11. These signals are amplified with amplifiers 16, 17 (LNA) prior to this. After the mixing, their filtering by the filters 18, 19 is executed and their sampling by an analog-digital converter 21 (ADC) integrated in the digital signal processor 20 (DSP) and the subsequent target detection by digital signal processing in the digital signal processor 20 (DSP).

In such radar devices 1 the control of the device resp. the sensor is achieved via a digital signal processor 20 (DSP). This control comprises among others the transmission signal generation and, temporally linked, the sampling of the received signals 14, 15 of several receiver aerials 12, 13. Furthermore, received signal processing and diagnosis of large parts of the sensor hardware are executed by the digital signal processor.

One property of the radar sensor is the relatively low degree of integration. The 24 GHz-transmission-signal generated by the VCO 7 and the TX-signal 5, as well as the LO-signals 11 transmitted to the individual, discrete-layout mixers 16, 17, are transmitted via equally discrete HF-lines 22, and on each line branching via Wilkinson dividers 23. This leads to a susceptibility of the circuitry on one hand to damages of the HF-lines 22, and on the other hand to damage-related failures of the Wilkinson-dividers 23.

The described susceptibility is particularly present in LO-line networks and would lead to serious impairment of the target detection capability of the radar device in case of damage or defect: In the respective receiver channels 3, 4 a failure or damping of one or more LO-signals 11 would not allow the correct mixing of the signal received via the respective receiving aerial 12, 13 into the baseband. The respective sampled signals representing the input parameters of signal processing for target detection, would be distorted or would fail completely.

Figure 2:
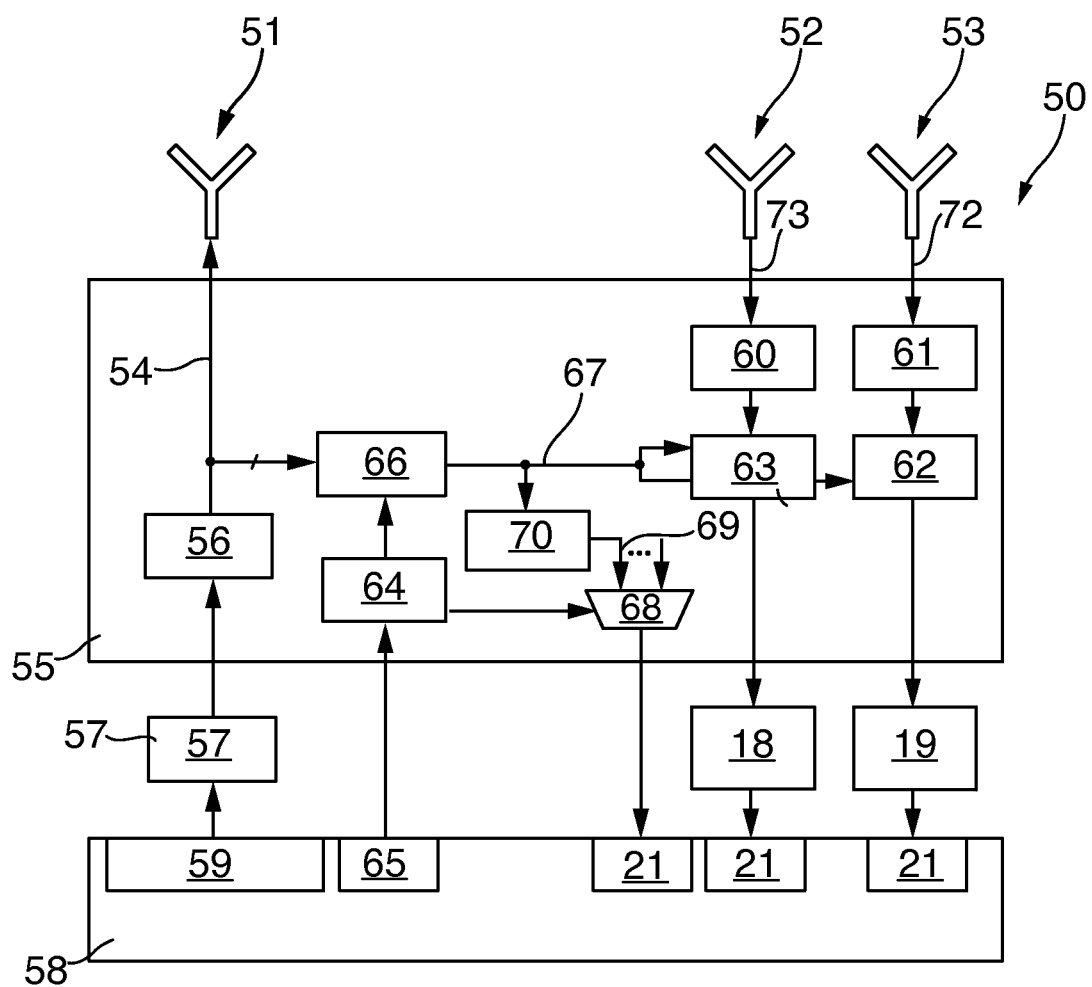
FIG. 2 is a schematic view of the radar device according to the invention.

FIG. 2 represents the schematic drawing of a circuitry of a radar device 50 according to the invention. FIG. 2 shows the circuitry of a radar device 50 according to the invention particularly relating to the generation of a transmission signal and the processing of a received signal.

Figure 3:
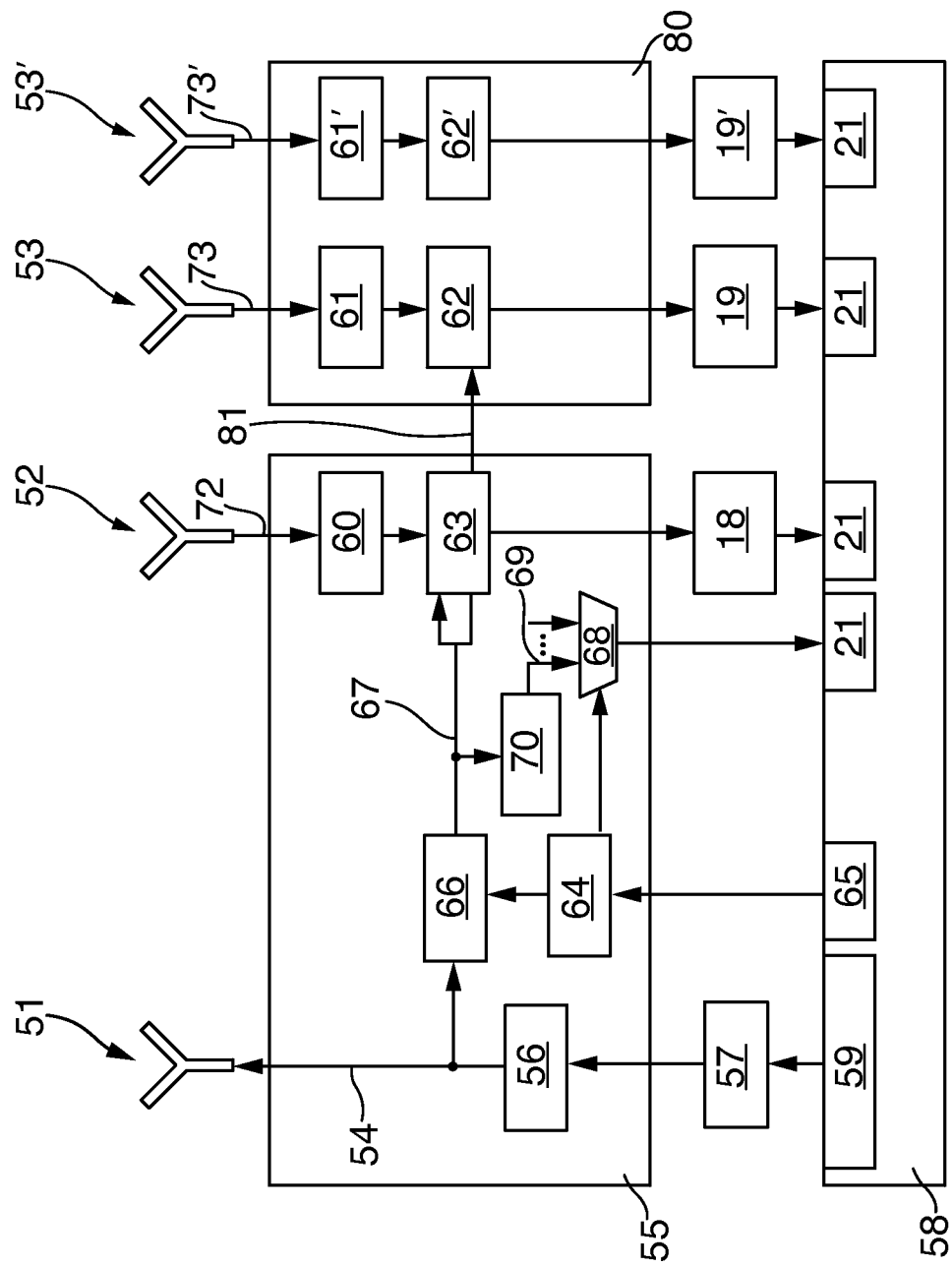
FIG. 3 is a schematic view of a further embodiment of a radar device according to the invention.

FIG. 3 shows a further advantageous embodiment of the radar device according to the invention.

The radar device 50 allows an improved diagnosis of the LO-lines. To this end, the radar device 50 comprises a transmission path 51 and receiver channels 52, 53. The generation of the transmission signal 54, also called TX-signal, in the frequency range around 24 GHz is executed by means of the activation of a voltage-controlled oscillator 56 (VCO) integrated in a Monolithic Microwave Integrated Circuit 55 (MMIC) via a Digital-Analog-Converter 57 (DAC) in transmission path 51. The oscillator 56 (VCO) is integrated in the Monolithic Microwave Integrated Circuit 55 (MMIC). The activation of the Digital-Analog-Converter 57 is achieved by means of a digital signal processor 58 via a DAC-control 59.

The wiring according to FIG. 2 entails the application of a defined test signal, as well as its detection in the signals of the receiver channels. Furthermore, the simultaneous measurement of the LO-signal power allows a statement on the measurability of this parameter.

When compared to the radar device 1 according to FIG. 1, a higher degree of integration can be recognized in the used Monolithic Microwave Integrated Circuit 55 (MMICs) in the radar device 50. In addition to the integration of the LNAs 60, 61 and the mixers 62, 63 in the reception area 52, 53, the integrated control unit 64 can be recognized, which can be programmed directly by the digital signal processor 58 (DSP) via an SPI-interface 65.

The 55 MMIC-module comprises various modules. One of these modules is a switchable amplifier 66 for the LO-signal 67, which allows two amplification factors. This module 66 generally allows, through the modification of the LO-power, a movement of the operating point of the connected mixers 62, 63 of the receiver paths 52, 53. Furthermore it offers the opportunity to adapt and therefore also to possibly increase the output of the LO-signal, which is fed to the MMIC 80 via a HF-line, to this wiring in the radar device according to FIG. 3 having a separate, second MMIC 80 for the mixing of two received signals.

A further configurable module of the MMICs 55 is a multiplexer 68, which can, in addition to other signals, switch the measuring voltage of an MMIC-internal wattmeter 70 for the LO-signal 67 onto an MMIC output pin so that this voltage can be sampled via an ADC-channel 71 of the DSP 58 and be evaluated accordingly.

This allows a back measurement of the current LO-power, which already offers the possibility to detect a defect-related absence or a strong attenuation of the LO-signal in the MMIC 55.

For the monitoring of the LO-lines and/or the adaptability of the LO-power, a LO-measuring signal is generated at regular intervals by means of the switchable amplifier 66 during operation of the radar device, whose generation provides the respective diagnosis information in the receiver channels 52, 53 of the radar device.

For this LO-measuring signal, the oscillator 56 (VCO) is adjusted to a constant frequency. The switchable amplifier 66 of the LO-signal is switched with a defined sequence, which is represented in FIG. 4.

Figure 4:
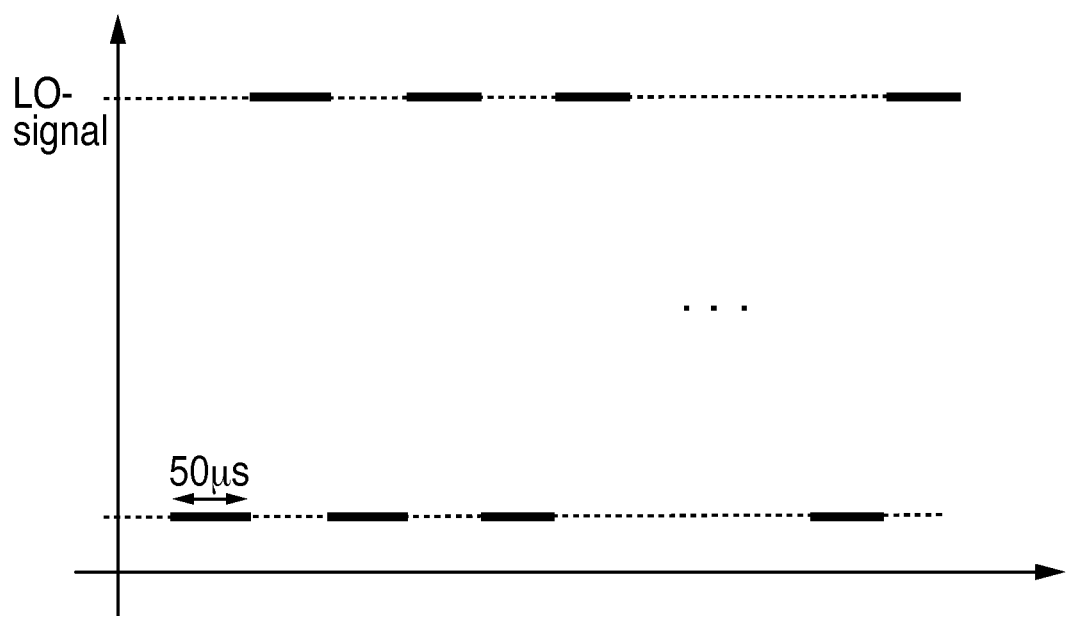
FIG. 4 is a diagram showing how a LO-signal is raised in intervals of 50 μs from a low level to a raised level and vice versa.

FIG. 4 shows how a LO-signal is raised in intervals of 50 µs from a low level to a raised level and vice versa. By means of the LO-signal of this shape with a length of 12.8 ms, the aerial signals 72, 73 of the individual receiver channels 52, 53 are mixed into the baseband and band-pass-filtered by means of the band-pass filters 18, 19. By selecting of a frequency of the switching sequence of 10 kHz, as shown in FIG. 4, the frequency of the LO-measuring signal lies within the pass range of the band-pass filter, so that the LO-measuring signal shares are not attenuated by the band-pass filters 18, 19, and are therefore detectable in the sampled received signals.

Figure 5:
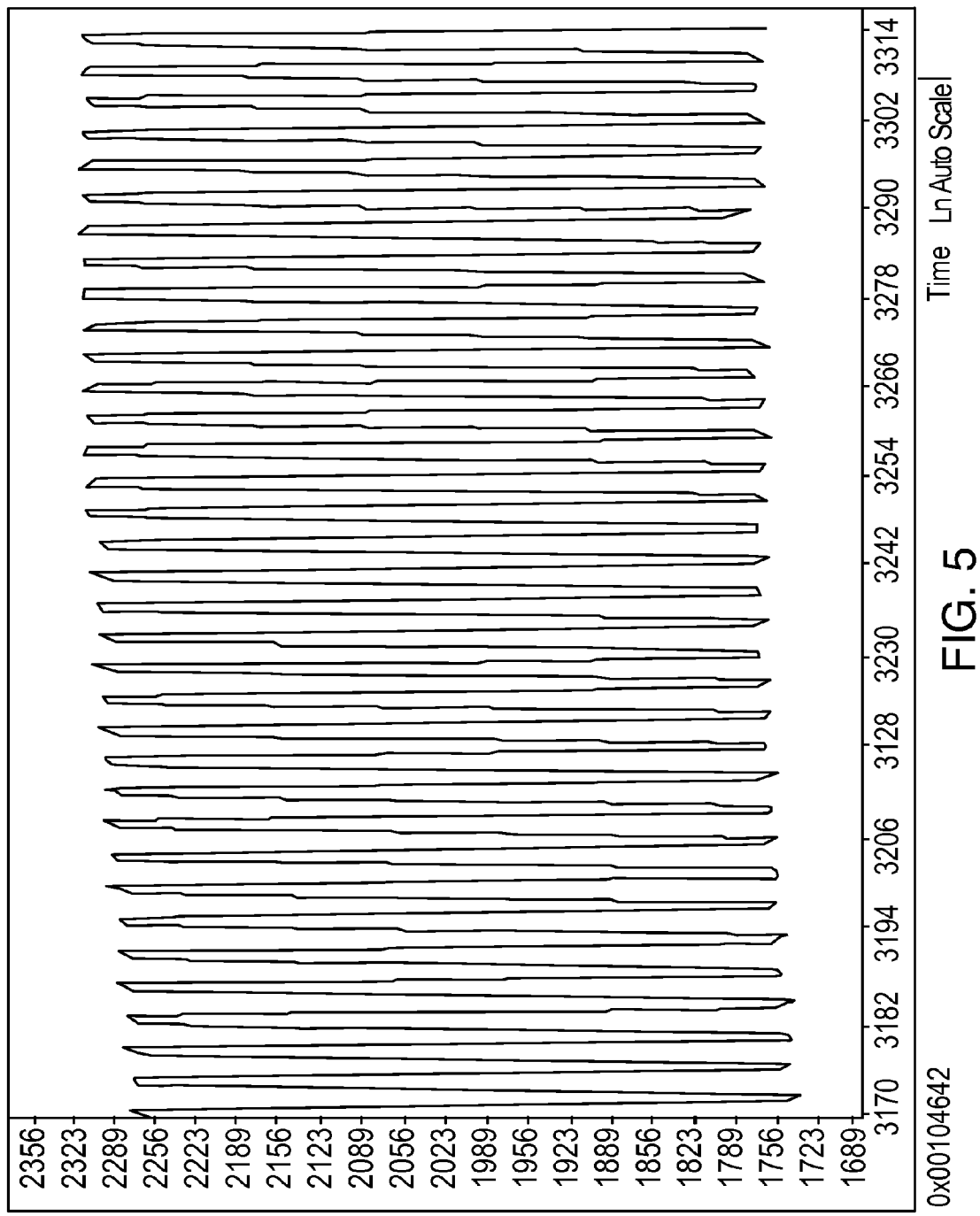
FIG. 5 is a diagram showing an embodiment of a section of a received signal.

FIG. 5 shows an embodiment of a section of the received signal, which was sampled by the digital signal processor 58 (DSP) at the output of a band-pass filter 18, 19.

The share of the LO-measuring signal is clearly visible here. Its detection can take place directly in the time range, but also in the frequency range after a Fourier-transformation. In the latter case, the detection of the LO-measuring sign is reduced to the detection of a peak in the spectrum, which, with a frequency of the measuring signal of 10 kHz, a sampling frequency of 40 kHz and an FFT-length of 512, must be at frequency bin 128. The amplitude ratios in FIG. 5 show that a robust detection of the measuring signal is possible. This detection in turn allows the conclusion, the LO-line to the respective mixers 62, 63 is intact and that the general switchability of the LO-signal is given.

For the verification of the measurability of the LO-power the configuration of the MMIC 55 is executed so that the measuring voltage of the LO-wattmeter 70 is led onto an output pin of the MMIC 55 and can be sampled and therefore evaluated by the digital signal processor 58 (DSP)

The circuitries of the FIGS. 2 and 3 illustrate this configuration option. With this configuration, the sampling of the measuring voltage proportional to the LO-power via the respective ADC-channel 71 of the digital signal processor 58 (DSP) during the set LO-measuring signal with the switching frequency represented in FIG. 4. With the measurability given and intact switchability of the LO-power, the power curve of the LO-signal which is determined by the switching sequence, is detectable in the sampled measuring voltage.

Figure 6:
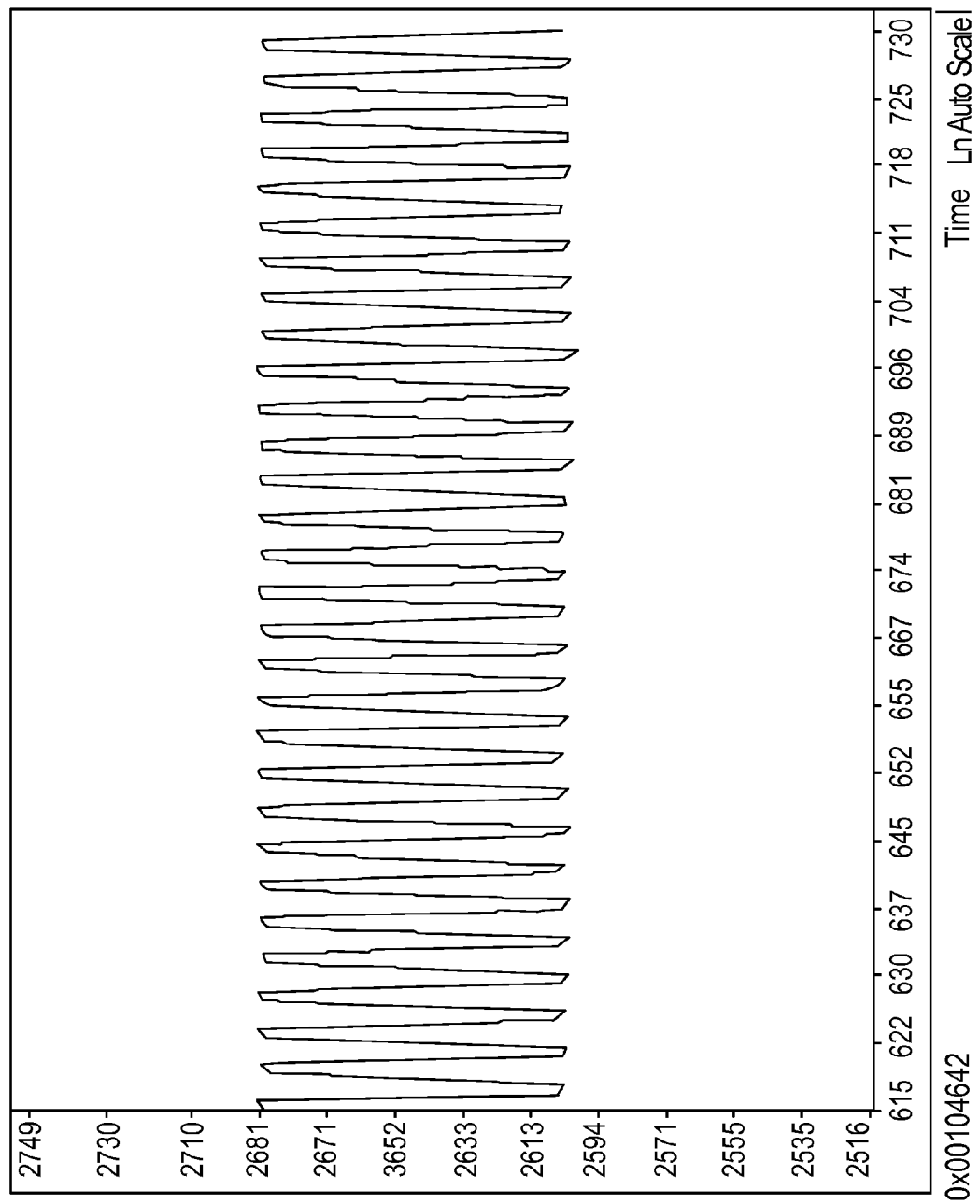
FIG. 6 is a diagram showing sampled values of a measuring voltage curve.

FIG. 6 shows the sampled values of a measuring voltage curve in an exemplary manner. As in FIG. 5, the share of the LO-measuring signal is also clearly visible in FIG. 6. The detection of the alternating share corresponding to the switching frequency from FIG. 4 is executed analog to the procedure during the evaluation of the receiver channels, as described above. From FIG. 6 it is obvious, that a reliable detection of the measurability of the LO-power is possible.

If the frequency share of the LO-measuring signal of 10 kHz is detected in the measuring voltage of the LO-wattmeter, the measurability of the LO-power is given. If, in contrast, the frequency share is not detected, it is necessary to distinguish between two cases:

1. If the frequency share of the LO-measuring signal is detected in at least one aerial received signal, switchability of the LO-power is given, the measurability of the LO-power via the LO-wattmeter is not given, however, therefore indicating a defect in this area.

2. If the frequency share of the LO-measuring signal is not detected in any of the aerial received signals, a defect-related, missing switchability of the LO-power is the most probable error.

For the verification of the adjustability of the LO-power, it is sufficient to detect the alternating share of the LO-measuring signal in one of the two or three signals of the receiver channels. When monitoring the LO-lines, in contrast, the detection of the LO-signal is necessary essentially in every signal of the receiver channels to ensure that signal transmission via the respective LO-line is intact.

This is of particular importance in a radar device according to FIG. 3, as a separate MMIC 80 is used for the processing of two aerial receiver channels, which has no 24 GHz-oscillator. For the downmixing of the aerial signals, the LO-signal must therefore be provided via a MMIC-external HF-line 81. If this line failed due to a defect, a demodulation of the respective aerial signals would not be possible.

With the detection of the shares of the LO-measuring signal in the signals of all receiver channels described above, however, the detection in the respective signals of the MMIC 80 is also possible as a derived measurement. If the share of the LO-measuring signal is detected in at least one of these signals, the LO-line 81 between the MMIC 55 and the MMIC 80 from FIG. 3 is intact. If, however, a share of the LO-measuring signal cannot be detected in any of the MMIC receiver channels 53, 53', a lack of availability of the LO-signal in MMIC 80 is probable and a respective device fault can be set.

According to the invention it is advantageous, that the diagnosis of the LO-lines as well as the adjustability of the LO-power of a radar device can be achieved by means of an explicit measurement. If the LO-signal is no longer available at one or several mixers due to a hardware defect, this defect can be detected reliably during operation by a radar device according to the invention.

It is also advantageous, that an explicit back measurement of the current LO-power offers a reliable verification of the measurability of the power, which complements the diagnosis of the LO-power adjustment to form a comprehensive concept for radar devices.

In the radar devices according to the invention, the availability of the LO-signal for the used receiver MMIC is reliably determined.

The invention claimed is:

1. A radar device for the transmission of a signal in a frequency band, comprising:
   a control means;
   an oscillator, wherein an input of the oscillator is connected to the control means by means of a converter, the oscillator being controllable by means of the control means for the generation of the signal, and wherein the signal can be picked up on an output of the oscillator;
   at least one transmission aerial for the transmission of the signal present at the output of the oscillator, wherein the transmission aerial is connected to the output of the oscillator;
   at least one receiver channel for the reception of a received signal, and for the processing of the received signal and for the transmission of the processed received signal to the control means, wherein the receiver channel has at least one receiving aerial and a mixer for the mixing of the received signal with the signal which is present at the output of the oscillator, wherein the mixer is connected to the output of the oscillator;
   wherein the output of the oscillator is connected to an input of a switchable amplifier and the amplifier provides a signal at the output and transmits it to the at least one mixer and a wattmeter being provided which monitors the signal at the output of the amplifier and transmits it to the control means.

2. The radar device according to claim 1, wherein the switchable amplifier can be controlled by a control unit being connected to the control means via an interface.

3. The radar device according to claim 1, wherein a multiplexer is provided, which is connected to the control unit and the wattmeter on the input side and with the analog-to-digital converter of the control means on the output side.

4. The radar device according to claim 1, wherein the oscillator, the amplifier, the control unit and the wattmeter are embodied as an integrated unit or discretely.

5. The radar device according to claim 4, wherein the integrated unit comprises also at least one receiver channel with a respective mixer.

6. The radar device according to claim 4, wherein a further integrated unit is provided with comprises at least one further receiver channel with a respective mixer.

7. The radar device according to claim 1, wherein a receiver channel has a mixer for the reception of a received signal, for the processing of the received signal and for the transmission of the processed received signal to the control means, wherein the output of the mixer is connected to a filter and the output of the filter is connected via an analog to digital converter to the control means.

8. The radar device according to claim 1, wherein the output signal of the oscillator can be changed from a low level to a raised level and vice versa in a time-dependent manner by means of the switchable amplifier, and that such a signal can be mixed with the aerial signals of the individual receiver channels in the baseband and filtered by means of the filters.

9. The radar device according to claim 8, wherein by means of the selection of the frequency of the switching sequence of the switchable amplifier, the frequency of the LO-measuring signal lies within the passband of the filter, for example a band-pass filter, so that the shares of the LO-measuring signal are not dampened by the filters and are detectable in the sampled received signals.

* * * * *